United States Patent [19]

Garcera et al.

[11] Patent Number: 4,956,087
[45] Date of Patent: Sep. 11, 1990

[54] MODULE FOR RIGID CYLINDRICAL MEMBRANE ELEMENTS FOR SEPARATION, FILTRATION, OR CATALYTIC TRANSFORMATION

[75] Inventors: Daniel Garcera, Tarbes; Jacques Gillot, Laloubere, both of France

[73] Assignee: Societe Anonyme dite: Societe des Ceramiques Techniques, Bazet, France

[21] Appl. No.: 376,454

[22] Filed: Jul. 7, 1989

[30] Foreign Application Priority Data

Jul. 29, 1988 [FR] France .................. 88 10280

[51] Int. Cl.$^5$ .............................. B01D 63/04
[52] U.S. Cl. .................. 210/321.8; 210/321.89
[58] Field of Search .................. 55/183, 16, 480, 484, 55/502, 505, 523; 210/195.2, 257.2, 232, 314, 321.6, 321.64, 321.72, 321.78, 321.79, 321.8, 321.88, 321.87, 321.89, 500.23

[56] References Cited

U.S. PATENT DOCUMENTS 4,640,774 2/1987 Garcera et al. .................. 55/502

Primary Examiner—Frank Sever
Attorney, Agent, or Firm—Sughrue, Mion, Zinn, Macpeak & Seas

[57] ABSTRACT

A module (1) for rigid cylinder membrane elements (2) for separation, filtration, or catalytic transformation, the elements (2) being received in a vessel which is generally cylindrical and parallel thereto, and closed by a first end plate (4) and a second end plate (5) to which the ends of the elements (2) are fixed by means of seals (6,7). The end plates are interconnected by at least one spacer constituted by at least three juxtaposed oblong parts (10, 20, 30) made of materials selected for reducing the expansion differences that would otherwise occur on a change in the temperature of the vessel and its membrane elements.

17 Claims, 4 Drawing Sheets

MODULE FOR RIGID CYLINDRICAL MEMBRANE ELEMENTS FOR SEPARATION, FILTRATION, OR CATALYTIC TRANSFORMATION

The present invention relates to a module for rigid cylindrical membrane elements for separation, filtration, or catalytic transformation.

BACKGROUND OF THE INVENTION

In outline, such a module comprises a vessel or casing receiving said rigid elements which may be membranes, or membrane supports. These elements which are made of a rigid substance such as a ceramic, glass, carbon, or a metal, are referred to below as "active" elements. More precisely, a module comprises:

a vessel which is generally cylindrical in shape and made of a metal or a plastic material optionally reinforced by fibers; and one or more active elements which are generally tubular or quasi-tubular in geometry, in particular of the multi-channel type, such as described in the following publications:

- J. Gillot and D. Garcera—"Nouveaux Media Filtrants Céramiques pour Microfiltration Tangentielle et Ultrafiltration" (New Ceramic Filter Media for Ultrafiltration and Tangential Microfiltration) Conference FILTRA 84—Sté Française de filtration October, 1984 Paris; and
- J. Gillot—G. Brinkman—D. Garcera—"New Ceramic Filter Media for Crossflow Microfiltration and Ultrafiltration", Fourth World Filtration Congress 22–24 April, 1986—Ostende, Belgium;

and which are generally much longer along the channel than across the channel. These active elements are assembled with the axis of the, or each, channel running parallel to the axis of the vessel. The membrane covers the inside surface of the channel or channels in these elements, or in some circumstances the outside surface when the elements are tubes;

a set of two end plates (which are generally very rigid) together with seals which:

mechanically support the two ends of each active element and maintain them in position;

separate the fluid treatment installation into an upstream region and a downstream region relative to the membrane; and provide sealing between these two regions; and parts situated inside or at the periphery of the bundle of active elements and extending parallel thereto, with said parts serving to hold the end plates together mechanically. These parts do not have any active role to play with respect to fluid treatment per se, and are referred to below as props. They are required only when the module has a large number of active elements.

Such a module must be capable of operating for several years without being disassembled. Unfortunately, when the module is subjected to major temperature variations, in particular when it is assembled at ambient temperature but used at a high temperature or at a low temperature, differences in longitudinal expansion appear between the active elements on the one hand and the vessel and its props on the other. These differences in expansion may be as much as one or more millimeters when the active elements are about one meter long, which is commonly the case. In general, this difference in expansion cannot be avoided since the materials from which the active elements are made and from which the vessel and its props are made are normally different since they satisfy different requirements. When active elements made of porous ceramic material are mounted in a metal vessel having a coefficient of expansion which is generally greater than the ceramic, high temperature use tends to put the ceramic elements under tension, which they withstand poorly.

In prior assemblies, the expansion difference is taken up in two different ways.

When the end plates are fixed to the vessel, and also when props are present, the difference in expansion must be absorbed by the seals situated between the ends of the active elements and the end plates. This means that each element should have, at least at one end:

either a sliding seal, in which case sealing is difficult to maintain if thermal cycling also takes place, particularly when the fluid to be treated contains particles in suspension (i.e. filtration) since the particles penetrate between the facing surfaces of the seal;

or else flexible seals are provided, e.g. of the elastomer type or of the metal bellows type, in which case they are very expensive. If the seal is of the elastomer type, then it must be sufficiently wide laterally for the angular deformation due to a longitudinal expansion of several millimeters to remain acceptable, and this means that a bundle of active elements takes up too much room;. In addition, there are then problems associated with the nature of elastomers: no elasticity at cryogenic temperatures; and poor mechanical and chemical performance at high temperatures over long periods of time in the presence of the fluids to be treated.

When there are no props and the module contains a plurality of active elements, the differential expansion can be absorbed by a flexible or a sliding seal situated at the periphery of one of the end plates, between said plate and the vessel. However, this solution suffers from the drawback of applying forces on the seals between the active elements and the end plates due to the difference in fluid pressure on opposite sides of the end plates; in other words the seals are subjected to shear. In addition, these forces are then transmitted to the active elements themselves which are subjected to traction or to compression. When tangential filtration is being performed with frequent backwashing of the membranes by pressure reversal, then the filter elements are cyclically subjected to traction and to compression, and this is most unfavorable.

The object of the invention is thus to provide a module structure in which the end plates and the seals are required to absorb small residual expansion differences only, e.g. due to non-uniform temperature distribution within the module.

SUMMARY OF THE INVENTION

The present invention provides a module for rigid cylinder membrane elements for separation, filtration, or catalytic transformation, said elements being received in a vessel which is generally cylindrical and parallel thereto, and closed by a first end plate and a second end plate to which the ends of said elements are fixed by means of seals, wherein said end plates are interconnected by at least one spacer constituted by at least three juxtaposed oblong parts, the first part being fixed to said first end plate, the third part being fixed to said second end plate, and the second part being fixed to the free ends of said first and third parts, the materials from which said three parts are made being selected in such a manner as to ensure that their overall expansion is equal to the expansion of said active elements.

In a first embodiment, said spacer constitutes said vessel.

In a second embodiment, said module includes one or more spacers forming one or more props disposed between said end plates.

In a third embodiment, said module includes a spacer constituting said vessel together with at least one spacer constituting at least one prop.

In a first variant, said spacer comprises three parts which are cylindrical and coaxial.

Advantageously, lateral displacement-restraining means are provided between said parts, and/or between at least one of said parts and one of the end plates.

Said cylindrical parts may be fixed together directly at their ends by welding, shrinking, or gluing.

In another mode of assembly, said cylindrical parts are fixed together at their ends via rings to which they are welded, screwed, shrunk on, or glued, said rings optionally also constituting means for preventing lateral displacement between said cylindrical parts.

In another variant embodiment, each part of said prop is constituted by a plurality of solid rods which are parallel to one another and to said active elements.

Thus, said rods pass through lateral guidance rings through which they slide or to which they are fixed. For lateral displacement-restraining purposes, one of the rods may have an end which penetrates into a blind hole in one of the end plates.

The invention also provides a module including at least one prop of the invention and a vessel constituted by a cylindrical part having one end which is rigidly fixed to said first end plate and having its other end connected in sealed manner to said second end plate by means of a deformable seal, said deformable seal being selected from the following types of seal: a sliding seal; a metal bellows; and an elastomer seal.

BRIEF DESCRIPTION OF THE DRAWINGS

Embodiments of the invention are described by way of example with reference to the accompanying drawings, in which.

DETAILED DESCRIPTION

Figure 1:
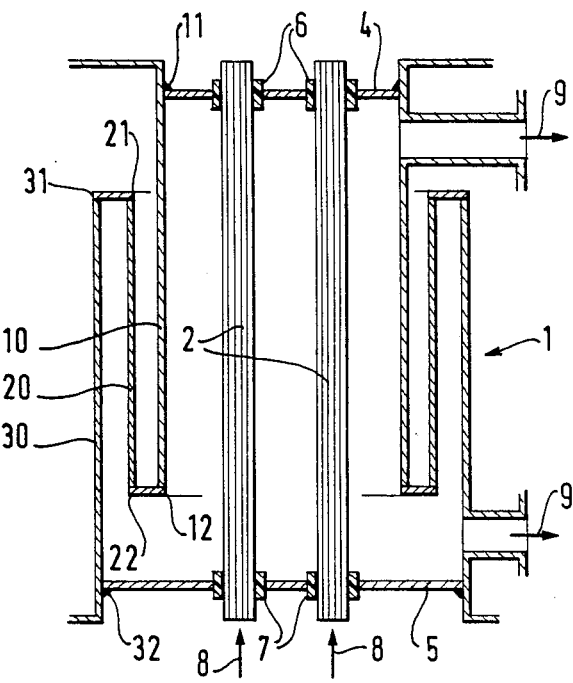
FIG. 1 is a highly diagrammatic longitudinal section through a first example of a module of the invention having a vessel made in three parts.

FIG. 1 shows a module 1 containing two active elements 2 having first ends fixed in a first plate 4 via interposed seals 6 and having second ends fixed in a second plate 5 via interposed seals 7. Naturally, the module generally contains a bundle of active elements 2. The inlets and the outlets for the fluid to be treated are referenced 8 and 9 respectively.

In accordance with the invention, the generally cylindrical outer vessel interconnecting the two plates 4 and 5 is made up from three coaxial parts 10, 20, and 30 whose end edges are respectively referenced 11 & 12, 21 & 22, and 31 & 33. The edges 11, 21, and 31 are situated close to the first plate 4, whereas the edges 12, 22, and 32 are situated close to the second plate 5. The edge 12 is connected to the edge 22 and the edge 21 is connected to the edge 31. In other words, the path from one end plate to the other end plate of the module 1 passes via the part 10, doubles back via the part 20, and continues in the original direction via the part 30. The parts 10, 20, and 30 are made of materials which are selected so that the overall expansion of the vessel they form is the same as that of the active elements 2 assembled inside the module 1.

If the expansion coefficient of the parts 10 and 30 is greater than that of the active elements 2, then the part 20 is made of a material which is chosen to have an expansion coefficient which is greater still than that of the parts 10 and 30 so that as temperature increases, the elongation of the part 20 moves the ends 12 and 31 away from each other, thus tending to move the ends 11 and 32 of the module towards each other, thereby compensating the excess elongation of the parts 10 and 30 relative to the active elements 20.

If the lengths of the parts 10, 20, and 30 are denoted L1, L2, and L3, respectively, and if the active element lengths are denoted Le, with said lengths being measured from the midplanes of the seals 6 and 7 connecting the active elements 2 to the end plates 4 and 5, and if the coefficients of thermal expansion of the parts 10, 20, 30 and of the active elements 2 are denoted D1, D2, D3, and De, respectively, then differential thermal expansion is compensated when:

D1.L1−D2.L2+D3.L3=De.Le, where
L1−L2+L3=Le

Figure 2:
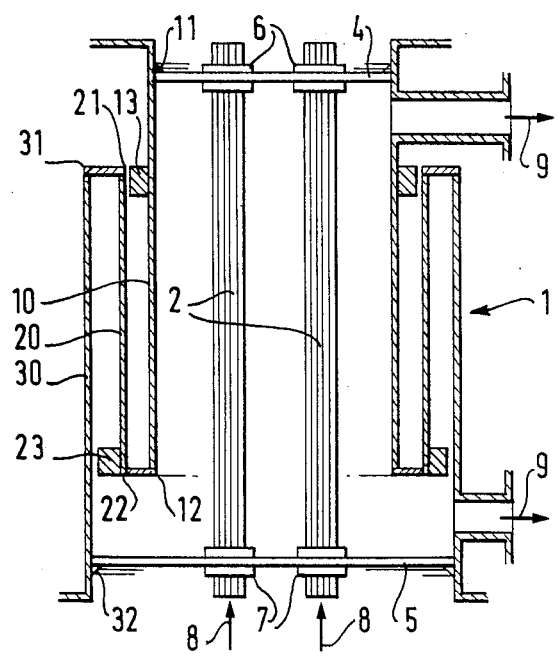
FIG. 2 is a highly diagrammatic longitudinal section through a variant embodiment of the FIG. 1 module.

FIG. 2 shows a variant in which it is desired to make the assembly more rigid. Lateral abutments 13 and 23 are provided so as to adjust the position of each end of the part 20 relative to those ends of the parts 10 and 30 to which it is not connected (i.e. to adjust the position of the end 21 relative to the end 11, and the position of the end 22 relative to the end 32). The abutments 13 and 23 are placed either on the intermediate part 20, or else on the parts 10 and 30. The surface of the other part facing the abutment is machined in such a manner as to ensure that free sliding is obtained. Tolerances are set to take account of the differences in thermal expansion between the parts 10, 20, and 30 in a direction perpendicular to their common axis.

Figure 3:
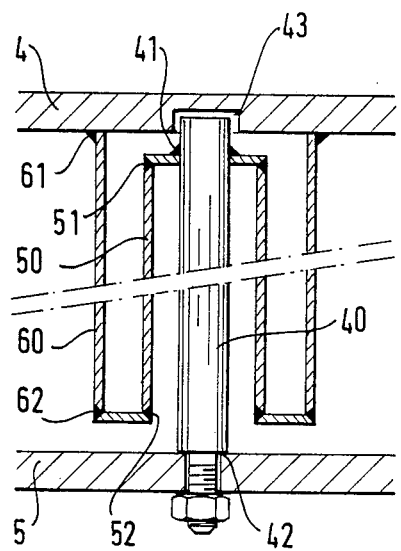
FIG. 3 is a highly diagrammatic longitudinal section through an example of a prop of the invention comprising three concentric parts.

FIG. 3 shows an example of a prop made up of three parts 40, 50, 60 in accordance with the invention and situated between the two end plates 4 and 5. Like the parts 10, 20, and 30, the ends of the parts 40, 50, and 60 are referenced 41 & 42, 51 & 52, and 61 & 62. These three parts are disposed concentrically, but the part 40 is a solid rod whose end 41 is held in place against lateral displacement inside a blind hole 43 provided in the end plate 4. The parts 40, 50, and 60 are fixed to one another in the same way as are the parts 10, 20, and 30.

Figure 4:
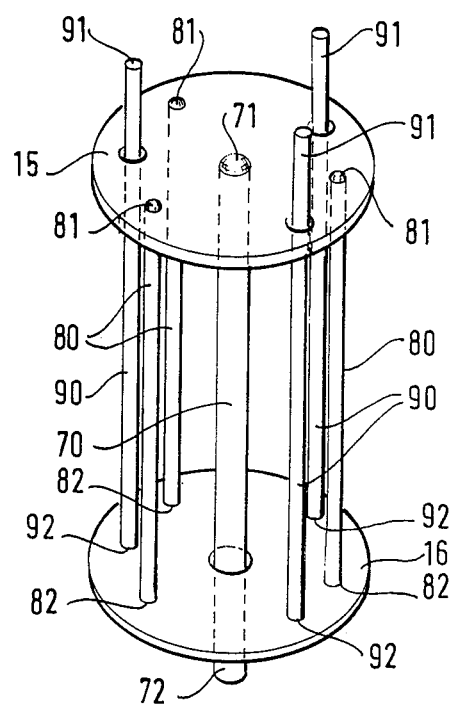
FIG. 4 is a diagrammatic perspective view of another example of a prop in accordance with the invention and comprising solid rods.

FIG. 4 shows a variant embodiment of the prop of the invention in which the tubes are replaced by solid rods which are either guided laterally by or else are fixed to two intermediate disks 15 and 16.

The central rod 70 fixed at 71 to the disk 15 is intended to be fixed at its end 72 to end plate 5 of the module.

Three intermediate rods 80 have their ends 81 and 82 fixed respectively to disks 15 and 16.

Three outer rods 90 have their ends 91 for fixing to end plate 4 of the module, while their ends 92 are fixed to the bottom disk 16. The rods 80 and 90 are disposed in a star configuration around the rod 70. The rods 90 are at 360°/3 intervals relative to one another and at 360°/(2×3) relative to the rods 80. The number 3 is chosen purely by way of example. The rod 70 is mounted to slide through the disk 16, and the rods 90 are mounted to slide through the disk 15.

In addition, the rods are suitable for engaging in blind holes situated in that one of the end plates 4 and 5 to which they are not fixed, for the purpose of restraining them laterally.

Stays made of concentric tubes have the advantage of occupying less volume than props comprising a central tube and rods. However, during changes in the temperature of the fluid inside the module, props made of concentric tubes suffer from the drawback that the innermost tube and the intermediate tube do not follow changes in temperature at once and this means that expansion is not properly compensated. A particularly advantageous variant therefore consists in using props made of concentric tubes in which the outer tube and the intermediate tube (and sometimes even the innermost tube) have openings through their surfaces in order to facilitate the flow of fluid so as to make contact with the inside tube and the intermediate tube, thereby ensuring that they are always at substantially the same temperature as the fluid.

In all of the above variants, the blind cavities in the chamber filled with fluid to be processed preferably have their openings directed downwards so as to prevent particles from accumulating therein by settling.

Figure 5:
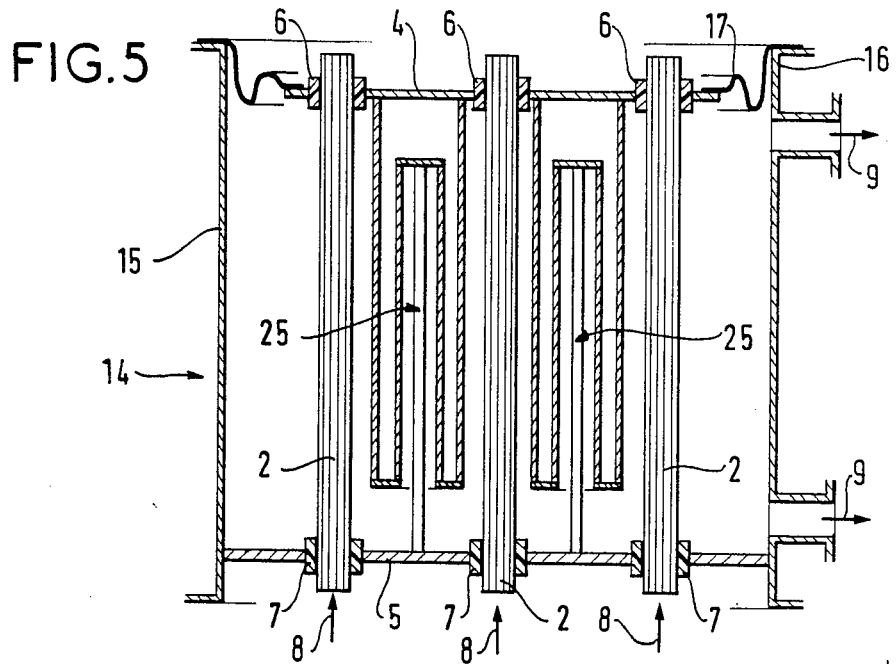
FIG. 5 is a highly diagrammatic fragmentary section through a variant module of the invention suitable for containing a large number of active elements.

FIG. 5 shows a module 14 intended to house a large number of active elements 2. It has end plates 4 and 5. The vessel 5 is a conventional cylindrical vessel. The end plate 5 is fixed rigidly to one of the ends of the vessel 15, whereas the end plate 4 is fixed to the other end 16 of the vessel via a deformable connection 17, which may be a fluid-tight flexible seal such as a bellows made of metal or elastomer, or else it may be a sliding seal. The two plates 4 and 5 are fixed together by temperature-compensated props 25 analogous to those of FIG. 3.

A module of this type has the following characteristics:

the seals 6 and 7 between the active elements 2 and the end plates 4 and 5 do not need to compensate expansion;

the forces due to the differences in fluid pressure on either side of the end plates are withstood by the props and are therefore not transmitted to the end seals 6 and 7 for the active elements 2, or to these elements themselves; and there is only one moving seal 17 between one of the end plates and the vessel 15. It is then possible to use a seal even if it is relatively expensive (e.g. a metal bellows). If the seal is made of elastomer, it may be cooled locally since it is at the periphery of the vessel and therefore relatively accessible. If necessary, it may be replaced at regular intervals, and this may be done without disassembling the active elements, which is particularly advantageous given the fragility of ceramics.

There follows a description of various different ways in which the parts constituting the vessel or the props in a module of the invention can be assembled to one another.

Figure 6:
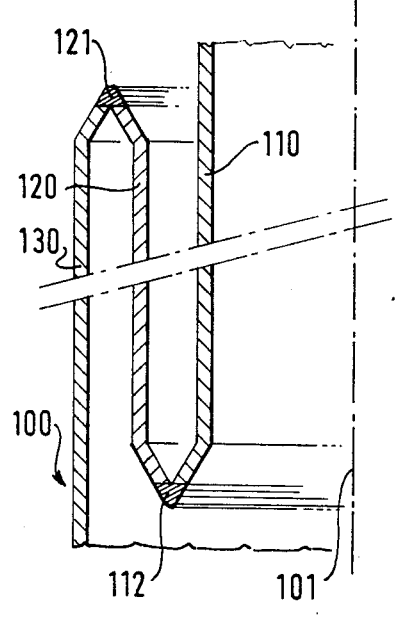
FIG. 6 is a diagram showing one way of directly welding together the three parts of a vessel in a module of the invention.

In FIG. 6, a vessel 100 about an axis 101 comprises three coaxial tubes 110, 120, and 130 which are welded, glued, or shrunk directly onto one another at 112 and 121. To make this possible, the ends of the tubes are slightly flared or tapering in order to bring them closer together.

Figure 7:
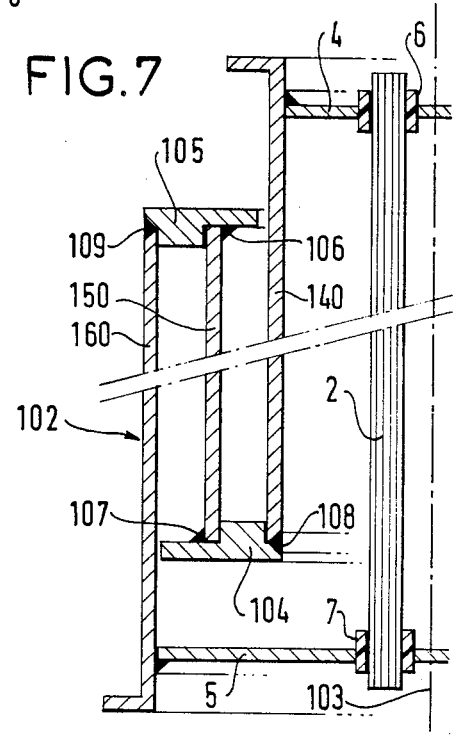
FIG. 7 is a diagram of another way of welding together the three parts of a vessel in a module of the invention.
Figure 8:
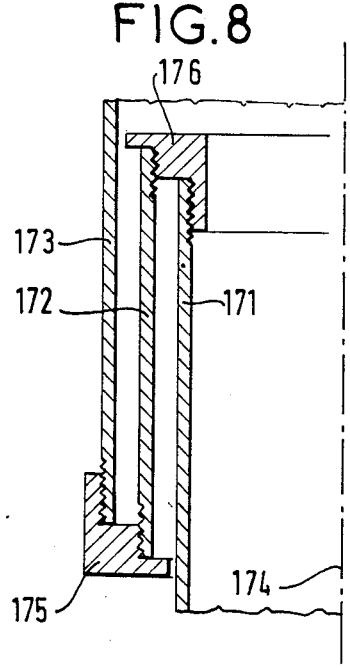
FIGS. 8 to 11 are diagrams of four examples showing how the three parts of the vessel of a module of the invention can be screwed together.
Figure 9:
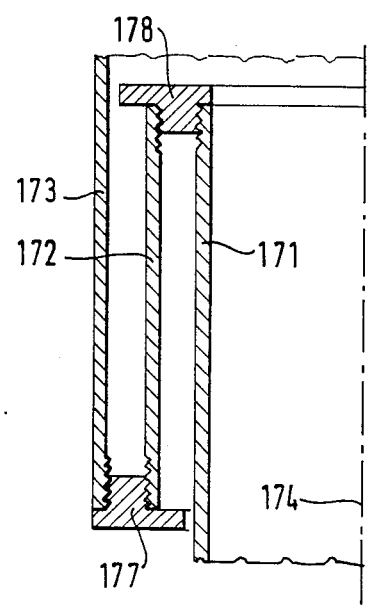
Figure 10:
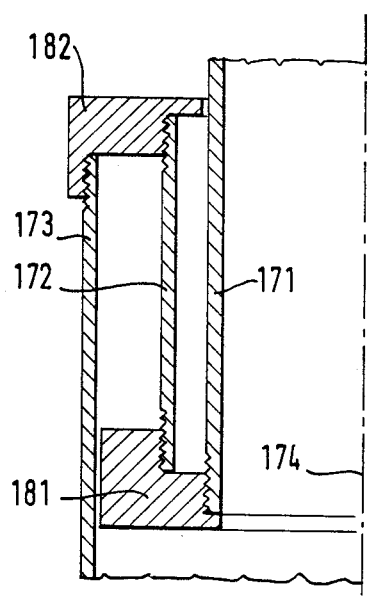
Figure 11:
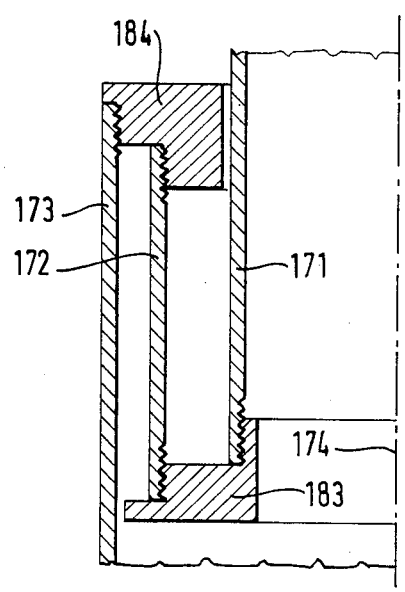

In FIG. 7, a vessel 102 about an axis 103 comprises three concentric tubes 140, 150, and 160 which tubes are welded, brazed, or glued to flanges 104 and 105 which also serve to restrain lateral displacement. Connections are made at the following ends, in succession: 106; 107; 108; and 109.

In FIGS. 8 to 11, the flanges which also serve for restraining lateral displacement are screwed to the parts. This disposition is particularly applicable to flanges of small diameter.

These figures show four vessels about respective axes 174 and each comprising three metal cylinders 171, 172, and 173 which are held together by being screwed to intermediate rings which also serve to restrain lateral displacement. These rings are referenced 175 & 176 in FIG. 8, 177 & 178 in FIG. 9, 181 & 182 in FIG. 10, and 183 & 184 in FIG. 11.

By taking advantage of the coefficients of expansion of the rings and of the relative dispositions of the male and female threads between the tubes and the rings, it can be ensured that differential expansion in a direction perpendicular to the axis gives rise to compression stresses only at the threads. For example, with the disposition shown in FIG. 10, assuming that the parts 171 & 173 and the two rings 181 and 182 have the same coefficient of expansion which is less than that of the part 172, then an increase in temperature will put the threads connecting the part 172 to the two rings under compression, without giving rise to stress in the other threads. The disposition shown in FIG. 11 will give the same result if temperature is lowered.

For props comprising concentric tubes, as shown in FIG. 3, the same fixing means can be used as for the vessels.

For props using solid rods of the type shown in FIG. 4, the rods may be fixed to the intermediate disks by gluing, welding, shrinking on, or screwing.

Naturally, methods of assembly may be combined including two or more of welding, gluing, shrinking on, and screwing.

Numerical examples are given below to show up the advantage of the invention more clearly. The data given for types of steel are in accordance with official French (AFNOR) standards. In all of the examples, the diameters given are outside diameters. In addition, the expansion coefficients specified are mean coefficients over the specified temperature difference. In fact, these coefficients are not absolutely constant with variation in temperature and exact compensation cannot be obtained over an entire temperature range.

EXAMPLE 1: prior art.

Thirty-six alumina active elements of length 820 mm and having a coefficient of expansion of $6.6 \times 10^{-6}/°C$. were disposed in a single cylindrical vessel made of Z30C13 type stainless steel of length 820 mm, diameter 400 mm, and having a coefficient of expansion of $11.5 \times 10^{-6}/°C$.

The difference in expansion between the active elements and the vessel on raising the temperature from 20° C. to 300° C. was 1.1 mm.

EXAMPLE 2: prior art.

An alumina active element having a length of 1000 mm and a coefficient of expansion of $6.6 \times 10^{-6}/°C$. was used. The vessel was a prior art reinforced polyacetal vessel made of a substance sold by the firm Hoechst under the trademark HOSTAFORM C.9023 GFK. Its coefficient of expansion was $50 \times 10^{-6}/°C$. The envelope was 1000 mm long and had a diameter of 80 mm. When the module was raised from 20° C. to 100° C., the difference in expansion between the active element and the vessel was 3.5 mm.

EXAMPLE 3

The same active elements were used as in Example 1, together with a vessel of the invention comprising:
- an inside cylinder of length 745 mm, diameter 390 mm and thickness 3 mm, made of ZEOC13 stainless steel having a coefficient of expansion of $11.5 \times 10^{-6}/°C$.;
- an outside cylinder of the same length, the same thickness, and the same material as the inside cylinder and having a diameter of 410 mm; and
- an intermediate cylinder of length 670 mm, diameter 400 mm, thickness 3 mm, made of Z8CNDT 17-12 stainless steel having a coefficient of expansion of $17.5 \times 10^{-6}/°C$.

These cylinders were assembled using the method illustrated by FIG. 6.

The module also included a tube and solid rod prop as shown in FIG. 4. The prop was made up as follows:

The central tube 70 had a diameter of 40 mm, a thickness of 4 mm, and a length of 745 mm. The three tubes 90 had a diameter of 15 mm and a length of 745 mm. Like the tube 70, they were made of the same steel as the inside and outside cylinders constituting the vessel.

The rods 80 had a diameter of 15 mm and a length of 670 mm and were made of the same steel as the intermediate cylinder of the vessel.

The tube 70 was welded, whereas the rods 80 and 90 were bolted onto the intermediate disks.

When this module of the invention was raised from 20° C. to 300°, the difference in expansion between the active elements and the vessel was less than 0.1 mm. This result should be compared with the result of Example 1.

EXAMPLE 4

Using the same alumina active elements as in Example 1, a module of the type shown in FIG. 5 was made, comprising:
- a non-compensated vessel having a diameter of 390 mm, a thickness of 5 mm, and a length of 820 mm, made of Z30C13 stainless steel and having a coefficient of expansion of $11.5 \times 10^{-6}/°C$.;
- thirty active elements; and
- seven props each comprising:
  - an inner tube of length 745 mm, diameter 20 mm, and thickness 3 mm, made of Z30C13 steel;
  - an outer tube of diameter 34 mm, the same length, same thickness, and the same steel; and
  - an intermediate tube of length 670 mm, diameter 27 mm, and thickness 3 mm, made of Z8CNDT 17 steel having a coefficient of expansion of $17.5 \times 10^{-6}/°C$.;

these tubes were connected to one another by screwing on flange rings.

The set of 30 active elements and 6 props was disposed in a hexagonal lattice configuration so as to form a regular hexagon whose center and six vertices were occupied by the props.

A first end plate was welded to one end of the vessel whereas a second end plate was connected to the other end of the vessel via a flexible metal seal allowing relative displacement of 5 mm parallel to the axis of the module.

When the temperature was raised from 20° C. to 300° C., the expansion difference between the active elements and the props was less than 0.1 mm. The expansion difference between the vessel and the active elements together with the props was 1.1 mm. This difference was absorbed by the flexible metal seal.

EXAMPLE 5 (to be compared with Example 2)

An alumina active element of length 1000 mm was taken together with a vessel in accordance with the invention comprising:
- an inside cylinder of length 934 mm, diameter 80 mm, and thickness 5 mm, made of reinforced polyacetal having a coefficient of expansion of $50 \times 10^{-6}/°C$., which substance was the same as the above-mentioned Hostaform C 9023 GFK;
- an outer cylinder of the same length, same thickness, and same material as the inner cylinder, but having a diameter of 104 mm; and
- a intermediate cylinder of length 868 mm, diameter 92 mm, thickness 5 mm, and made of non-reinforced polyacetal having a coefficient of expansion of $100 \times 10^{-6}/°C$., this substance being sold by the firm Hoechst under the trademark ULTRAFORM.

The three cylinders were connected together by gluing.

When the module was raised from 20° C. to 100° C., the difference in expansion between the active elements and the vessel was less than 0.2 mm. The improvement of the invention can be seen.

EXAMPLE 6

Eighteen active elements made of silicon carbide were used having a coefficient of expansion of $4.5 \times 10^{-6}/°C$. and a length of 1000 mm, together with a vessel of the invention comprising:
- an inner cylinder of length 970 mm, diameter 219 mm, and thickness 2 mm, made of Z6CND16−4 stainless steel having a coefficient of expansion of $10.8 \times 10^{-6}/°C$.;
- an outer cylinder of the same length, same thickness and same material as the inner cylinder, and having a diameter of 231 mm; and
- an intermediate cylinder of length 940 mm, diameter 225 mm, and thickness 2 mm, made of Z35NCW15 stainless steel having a coefficient of expansion of $17.5 \times 10^{-6}/°C$.

The three cylinders were welded together using intermediate flanges as shown in FIG. 7.

We claim:

1. A module comprising rigid cylindrical membrane elements for separation, filtration, or catalytic transformation, a vessel receiving said elements having an exterior tubular wall about said elements and which is generally cylindrical and parallel to said elements, first and second end plates closing opposite ends of said exterior tubular wall of said vessel, opposite ends of said elements being fixed by means of seals to respective end plates, the improvement wherein said end plates are interconnected by at least one spacer constituted by at least three juxtaposed oblong parts, said first part being fixed to said first end plate, the third part being fixed to said second end plate, and the second part being fixed to the free ends of said first and third parts, and wherein the material of said three parts have individual thermal expansion coefficients such as to ensure that their overall axial thermal expansion is equal to the axial thermal expansion of said active elements.

2. A module according to claim 1, wherein said spacer constitutes said vessel.

3. A module according to claim 1, wherein said module includes at least one spacer forming at least one prop disposed between said end plates.

4. A module according to claim 3, wherein said prop is constituted by a plurality of solid rods which extend parallel with one another and with said active elements.

5. A module according to claim 4, wherein said rods pass through lateral guidance disks through which they slide.

6. A module according to claim 4, wherein the end of at least one of said rods penetrates into a blind hole in an end plate for the purpose of restraining lateral displacement of said at least one rod.

7. A module according to claim 16, wherein lateral displacement-restraining means are provided between at least one of said parts and one of said end plates.

8. A module according to claim 3, wherein said vessel is formed by a single cylindrical part having one end rigidly fixed to said first end plate and having another end connected in sealed manner to said second end plate via a deformable seal.

9. A module according to claim 8, wherein said deformable seal is a sliding seal.

10. A module according to claim 8, wherein said deformable seal is a metal bellows seal.

11. A module according to claim 8, wherein said deformable seal is an elastomer seal.

12. A module according to claim 1, wherein said module includes a spacer constituting said vessel together with at least one additional spacer constituting at least one prop.

13. A module according to claim 1, wherein said spacer comprises three parts which are cylindrical and concentric.

14. A module according to claim 13, wherein lateral displacement-restraining means are provided between said parts.

15. A module according to claim 13, wherein said cylindrical parts ar directly fixed together at their ends.

16. A module according to claim 13, wherein said cylindrical parts are fixed together at their ends via rings to which they are welded.

17. A module according to claim 16, wherein said rings further comprise means for preventing lateral displacement between said cylindrical parts.

* * * * *